United States Patent

[11] 3,545,470

[72] Inventor Hamilton Neil King Paton
 4603 118th SE, Bellevue, Washington 98004
[21] Appl. No. 655,605
[22] Filed July 24, 1967
[45] Patented Dec. 8, 1970

[54] DIFFERENTIAL-PRESSURE FLOW-CONTROLLING VALVE MECHANISM
 16 Claims, 19 Drawing Figs.
[52] U.S. Cl. .................................................. 137/111,
 137/101, 137/610, 137/625.44, 137/484.2
[51] Int. Cl. ........................................................... G05d 16/04
[50] Field of Search........................................... 137/610,
 611, 612, 37, 38, 39, 45, 46, 85, 86, 101, 111, 118,
 100, 499, 504, 521, 522, 527, 625, 44, 595, 119,
 497, 498, 503, 484.2, 484.4; 98/(Inquired)

[56] References Cited
UNITED STATES PATENTS
| | | | |
|---|---|---|---|
| 1,825,103 | 9/1931 | Stacey.......................... | 137/611X |
| 1,905,733 | 4/1933 | Moore.......................... | 137/101 |
| 2,320,194 | 5/1943 | Olsen........................... | 137/504 |
| 2,353,535 | 7/1944 | Young.......................... | 137/625.44X |

Primary Examiner—William F. O'Dea
Assistant Examiner—William H. Wright
Attorney—Robert W. Beach ABSTRACT: A valve exposed to the pressures in two adjacent conduits is mounted to be moved by higher pressure in one conduit resulting from reduced flow through it into the other conduit for reducing the flow through it, tending to equalize the flows through the two conduits. In one form, the junction between a common conduit and two branch conduits houses a sector valve having its apex pivoted at the center of the common conduit to form a splitter valve for fluid flowing from the common conduit toward the branch conduits. Alternatively, a cylindrical valve sealed by spaced rolling collars in a casing connecting adjacent conduits can reciprocate into one or the other of such conduits to restrict flow through it.

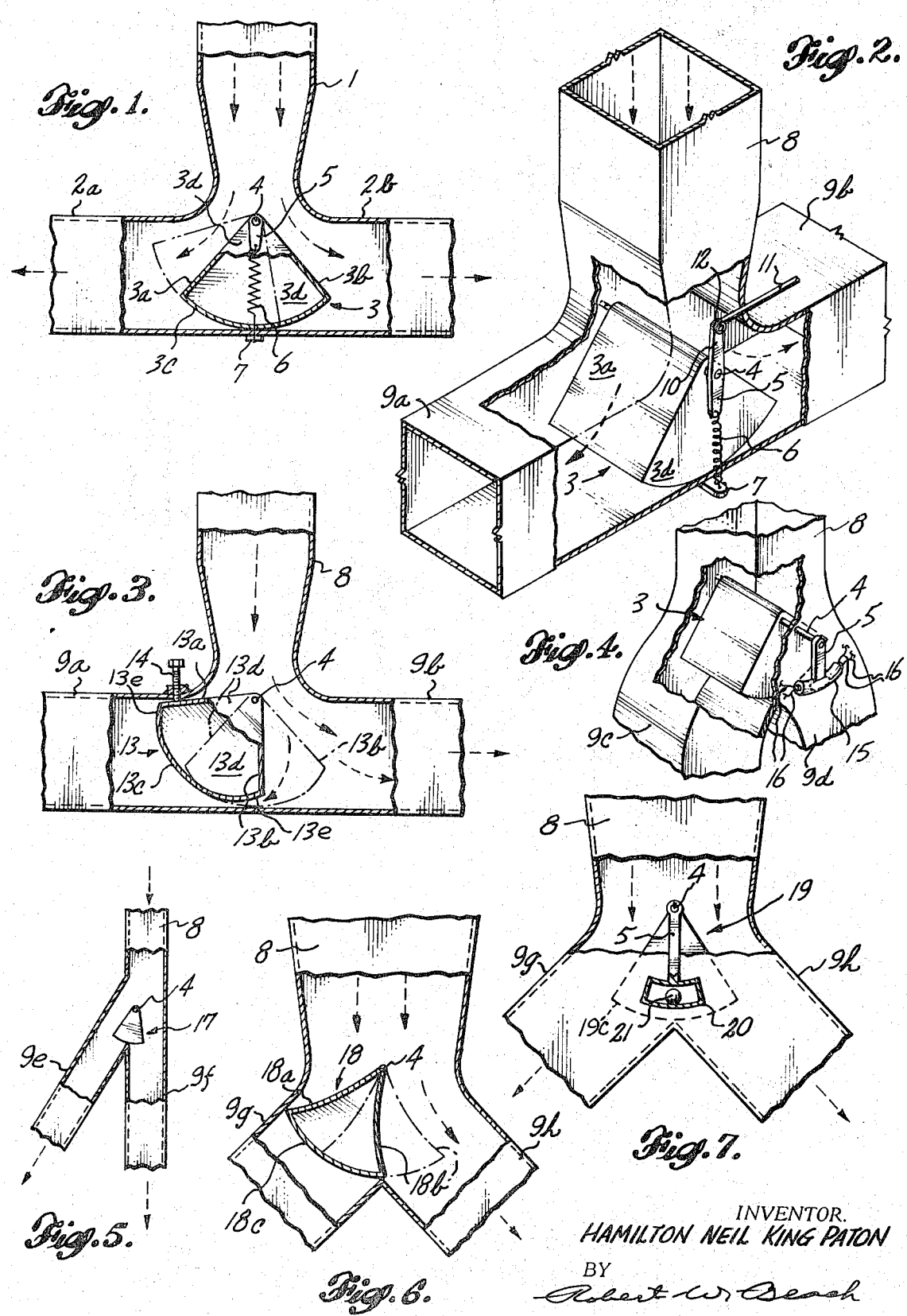

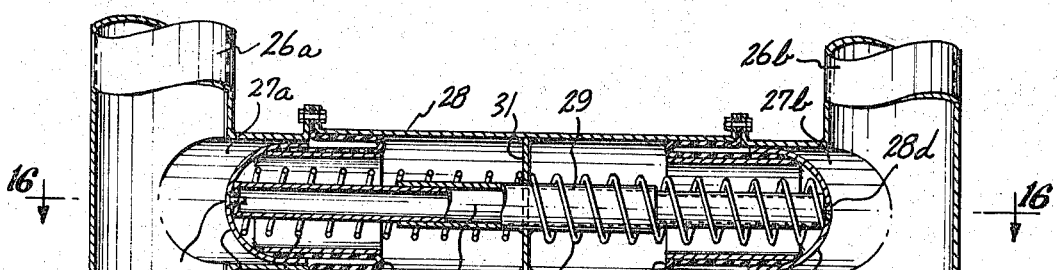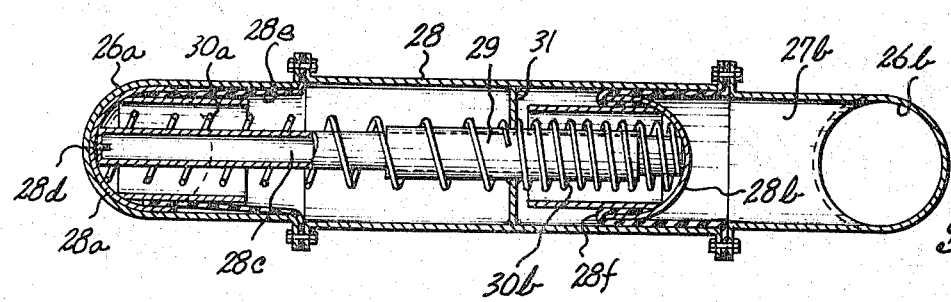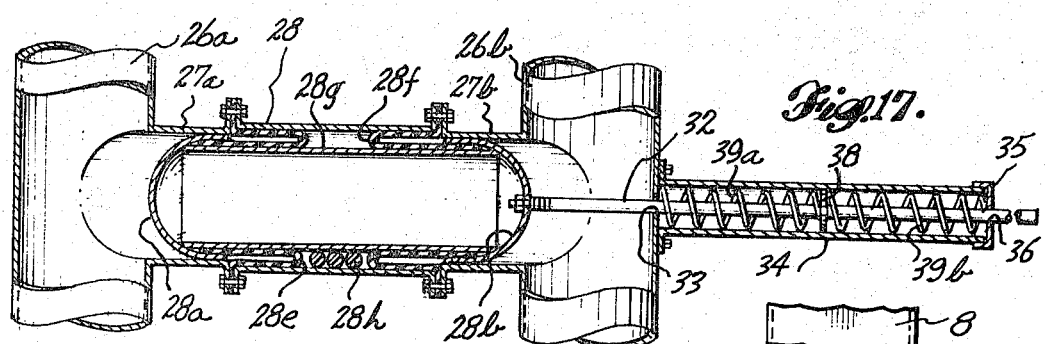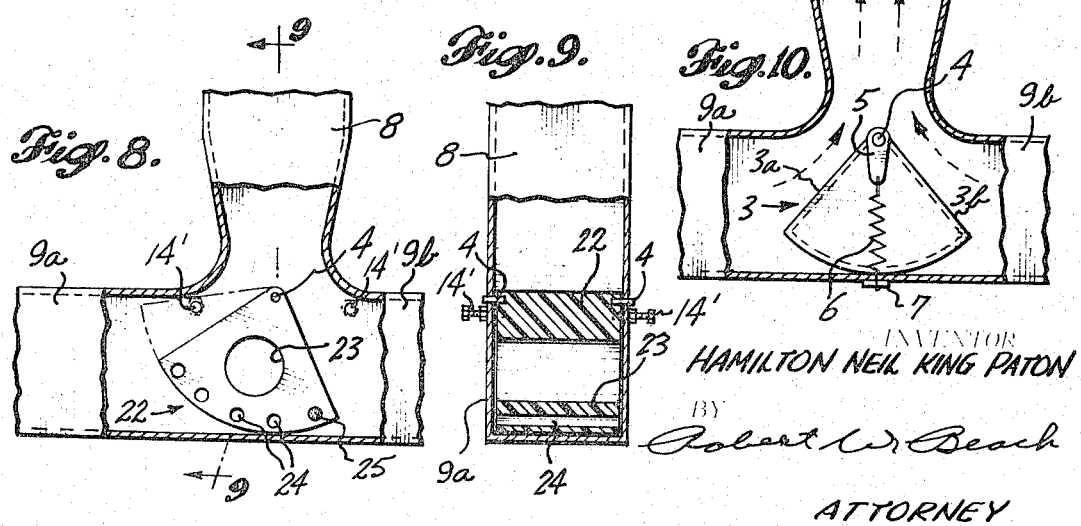

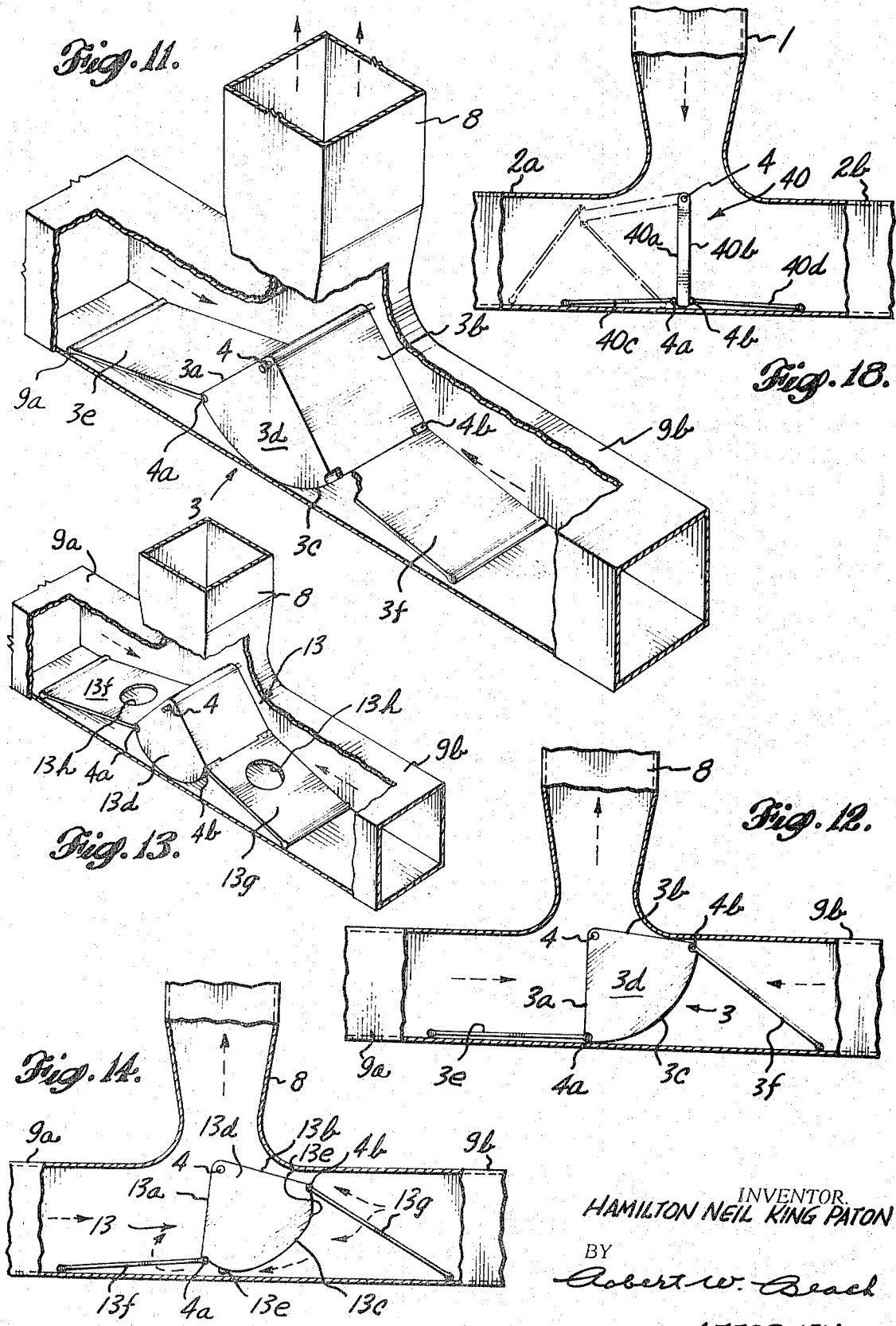

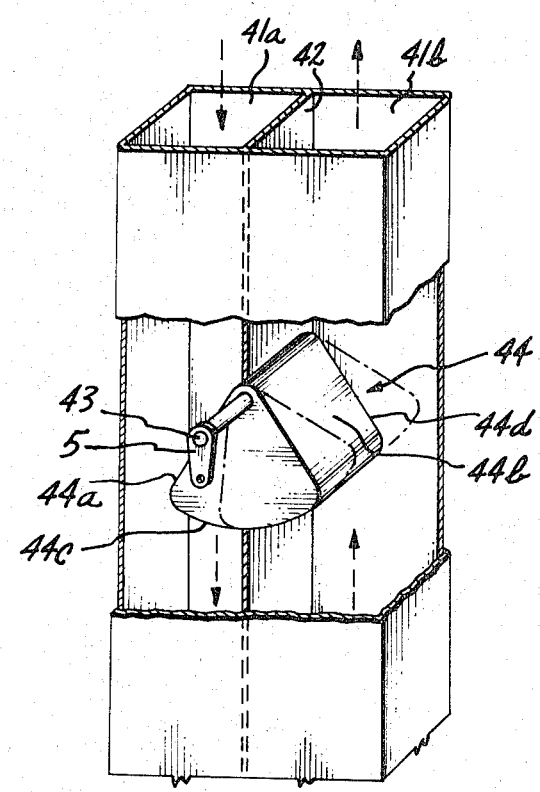

DIFFERENTIAL-PRESSURE FLOW-CONTROLLING VALVE MECHANISM

A principal object of this invention is to provide a valve responsive to differential pressure in adjacent conduits resulting from flow therethrough, which valve is movable by such pressure differential into one or the other of such conduits to throttle flow through the conduit in which the pressure is lower.

A more specific object is to throttle flow through a conduit in whichever direction fluid is flowing through the two conduits to tend to equalize the velocity of flow through such conduits, whether or not the conduits are of equal cross section. An incidental object is to effect a control operation to alter or terminate flow through such conduits on predetermined movement of the valve.

A further object is to provide such a control valve which will split the flow of air from a common conduit into two branch conduits. A companion object is to preload a valve so that it will tend to maintain an unequal velocity of fluid flow through branch conduits by the valve being off center during normal flow.

It is also an object to provide means for limiting movement of such a pressure-actuated valve by a pressure differential acting on it, so as to limit the degree to which a particular conduit can be restricted.

Another object is to provide a pair of venturi passages at opposite sides of a swingable valve in the junction between a common conduit and branch conduits, the relative size of which are altered by swinging of the valve caused by the action of differential pressure on it.

FIG. 1 is a plan of valve mechanism according to the present invention with parts broken away; FIG. 2 is a top perspective of another type of valve mechanism, FIG. 3 is a side elevation of a further modified type of valve mechanism, and FIG. 4 is a top perspective of a different arrangement, parts of each being broken away.

FIGS. 5, 6, 7 and 8 are side elevations of the other modifications of valve mechanism, parts of which are broken away, and FIG. 9 is a section on line 9–9 of FIG. 8.

FIG. 10 is a side elevation of a valve mechanism similar to that of FIG. 2, but arranged for flow of fluid through the conduits in the opposite direction.

FIG. 11 is a top perspective, and FIG. 12 is a side elevation of still another type of valve mechanism with parts broken away, and FIGS. 13 and 14 are corresponding views of generally similar, though somewhat modified, valve mechanism.

FIG. 15 is a side elevation of a reciprocable valve type of mechanism having parts broken away, and FIG. 16 is a section on line 16–16 of FIG. 15.

FIG. 17 is a side elevation of a modified type of reciprocable valve mechanism with parts broken away.

FIG. 18 is a side elevation of a further valve mechanism modification with parts broken away.

FIG. 19 is a side elevation of a further valve mechanism modification.

The valve mechanism of the present invention can take a variety of forms. In FIGS. 1 to 14, inclusive, a swingable sector valve is located in a valve body formed by the junction of a common conduit and two branch conduits. The particular arrangement of such common and branch conduits varies in the installations illustrated in these FIGS. and the installation of the valve differs. Also, in the installations of FIGS. 1 to 9, the flow of air is from the common conduit to the branch conduits and the sector-shaped valve is pivoted centrally of the common conduit, so that such valve serves as a splitter valve. In FIGS. 10 to 14, the flow of fluid is from the two branch conduits to the common conduit.

In FIG. 1, the common conduit 1 is connected to the branch conduits 2a and 2b in an arrangement such that the branch conduits are alined and disposed substantially perpendicular to the common conduit so that the common conduit and the two branch conduits form a tee. The common conduit and the sector conduits can be of square or rectangular cross section adjacent to the valve body, and if desired, such conduits can be connected beyond the valve body to conduits of circular cross section by suitable transition pieces which are not shown. The junction between these conduits constitutes a valve body in which the sector-shaped valve 3 fits closely. Such valve is located centrally in the valve body with its apex adjacent to the common conduit 1, and centered with respect to it. The apex is connected to the valve body by a pivot 4, enabling the valve body to swing about its apex.

The valve 3 preferably is of substantially quadrant shape, so that its flat radial sides 3a and 3b are disposed at substantially a right angle. The side 3c of the valve remote from pivot 4 is substantially cylindrically convex, and the radius of the valve sector is such that this side is located closely adjacent to the side of the valve body opposite the common conduit 1. The parallel sides 3d are spaced apart a distance substantially equal to the width of the valve body so that such valve sides lie close alongside the inner surfaces of the valve body. Such valve element 3 is shown as being of hollow sheet construction, and the sheet sides can be of metal or plastic. Alternatively, the valve element could be of solid construction, such as extruded, cast or machined metal, for example aluminum or molded plastic.

In the embodiment shown in FIG. 1, the axis of pivot 4 is vertical so that if the valve is swung from its normal centered position in one direction or the other, such as to the broken-line position of that figure, a restoring force can be applied by mounting an arm 5 on the pivot rod 4 exteriorly of the valve body and connecting such arm by a tension spring 6 to an anchor 7 on the valve body. Swinging of the valve from its normal position will cause the arm 5 to swing to increase the tension in spring 6, which will tend to swing the valve 3 back to the centered position shown in full lines in FIG. 1. Without such position-restoring means, the valve 3 is dynamically unstable, tending to snap into one extreme position or the other under the action of a pressure differential exerted on it.

The position-restoring means illustrated in FIG. 1 are merely representative and could be altered considerably while preserving their desired position-restoring function. Thus, the arm 5 could, for example, extend in the direction directly opposite that shown in FIG. 1, and the anchor 7 could be attached to the side of the common conduit 1. Alternatively, the arm 5 could extend radially in any desired direction, and the restoring means would function in the manner described if the arm 5 were in alignment with the anchor 7 for the tension spring 6 when the valve 3 is in the normal or centered position shown in FIG. 1. In fact, the normal position of valve 3 could be selected in a swung position about pivot rod 4 different from the centered position shown in FIG. 1. The restoring means would then tend to return the valve to such selected normal position if in that position the arm 5 is alined with the spring anchor 7.

Also, the position-restoring means could utilize a force-creating device other than a tension spring, such as oppositely-acting compression springs or some type of weight means. Alternatively, the restoring means could be of the voluntary type rather than of the automatic type utilizing spring means or weight means. The voluntary type would require some manipulation, such as repositioning of the arm 5 by hand or by a voluntarily-energized solenoid or by other thrust-producing device such as fluid-operated piston and cylinder. The valve should be left free to move under a differential pressure, however, when the voluntary position-restoring means is not in operation.

Assuming that prior to initiation of flow of fluid through the valve body, the valve element has been positioned in the normal centered position shown in FIG. 1, a passage for flow of fluid would be afforded between the opposite radial sides 3a and 3b of the valve element and the respectively opposite walls of the valve body. If fluid under pressure sufficient to cause it to flow is supplied to the common conduit 1, such fluid flow will be equally divided by the apex of the valve element 3 to flow through the branch conduits 2a and 2b, respectively, assuming that such branch conduits are of equal size. Under such circumstances, the valve element 3 acts as a splitter valve.

With the valve element 3 in the centered position shown in FIG. 1, it will be noted that the cross-sectional area of each passage formed between a radial valve body wall 3a or 3b and the side of the valve body opposite such valve element side is of smaller cross-sectional area than the cross section either of the common conduit 1 or of the branch conduits 2a or 2b. Whether the fluid flowing through the conduit system is gas moving at subsonic velocity or liquid, the velocity of flow through the two valve body passages will be greater than the velocity of fluid flow through the common conduit 1. Moreover, the velocity of fluid flow through such common conduit will be greater than the velocity of flow through either branch conduit if the combined cross-sectional area of these two conduits is greater than the cross-sectional area of the common conduit 1. Conversely, the pressure of the fluid in the passages adjacent to the radial walls 3a and 3b of the valve element 3 will be less than the fluid pressure in the common conduit 1, and less than the pressure in either branch conduit 2a or 2b because of the venturi action.

If the steady fluid flow state described above should be upset, such as by change in pressure in one of the branch conduits 2a and 2b, for example, the relationship of the fluid pressure in the several portions of the conduit system would be affected correspondingly. If it is assumed, for example, that the flow through branch conduit 2b is obstructed in some way, a greater proportion of the fluid moving from the common conduit 1 into the valve body would tend to be diverted into the branch conduit 2a because of the smaller resistance. The velocity of flow into branch conduit 2b would decrease correspondingly and the fluid pressure in such conduit, and, consequently, in the passage between the radial valve element wall 3b and the opposite side of the valve body, would increase.

Simultaneously, because of the flow of a greater portion of the fluid through the passage between the radial valve element wall 3 3a and the side of the valve body opposite it the fluid pressure in the branch conduit 2a would decrease as would the fluid pressure in the passage between the radial valve element wall 3a and the side of the valve body passage opposite it. The differential between the higher fluid pressure acting on the valve element wall 3b and the lower fluid pressure acting on the valve element wall 3a urges the valve to swing about its pivot rod 4 toward the broken line position indicated. Such swinging of the valve would also swing arm 5, which would stretch spring 6, tending to resist such swinging of the valve. Moreover, the farther the valve is swung toward the broken line position, the more rapidly will the force of spring 6 increase, tending to restore the valve to its normal centered position.

As the valve element 3 swings from its full-line position of FIG. 1 toward the broken line position, the cross-sectional area of the passage between the radial valve element wall 3b and the side of the passage opposite it will increase. Consequently, the velocity of fluid flow through this passage will decrease and the fluid pressure on the valve side 3b will increase correspondingly. At the same time, such valve movement will reduce the cross-sectional area of the passage between the valve side 3a and the valve body wall opposite it, so as further to increase the velocity of flow of fluid through such passage and decrease correspondingly the fluid pressure on the valve element wall 3a.

By such valve swinging, therefore, the differential between the pressure on the valve element side 3b and the valve element side 3a will increase in opposition to the increasing restoration force exerted on arm 5 by spring 6. Consequently, when the initial flow equilibrium providing equal flow through the two branch conduits 2a and 2 b has been upset, the valve element 3 will tend to swing progressively toward, and perhaps even beyond, the broken line position of FIG. 1 until a new equilibrium condition is reached where the fluid pressure differential on the two valve element radial walls 3a and 3b is balanced by the increasing tension on the position-restoring spring 6. Because of the tendency of the valve element 3 to continue its movement away from centered position when the flow equilibrium in the system has been upset, the valve may swing far enough so that one of its radial sides 3a and 3b will contact with a wall of the valve body. The valve will remain in contact with such wall if there is slight leakage past it, as long as the differential pressure acts on it, and if there is no leakage, the valve will flutter or chatter at such extreme position.

The alteration in flow conditions resulting from partial clogging therefore, one branch conduit 2a or 2b is not easily predictable. As the pressure differential effects swinging of the valve element 3 away from its centered position to increase the cross-sectional area of one passage to a branch conduit, such as the passage formed between the valve side 3b and the wall of the valve body opposite it, such increase in size will tend to induce flow through that passage of a greater proportion of the fluid supplied through the common conduit 1. The actual flow through such passage which occurs, therefore, will be determined by the relative effect of the degree of the obstruction of branch conduit 2b and the increase in cross section of the passage past valve element side 3b into such conduit. The increased flow which may be induced by such increase in cross-sectional area of the passage to the branch conduit 2b may be effective to decrease or even remove the obstruction in branch conduit 2b which upset the flow conditions.

Obstruction of one of the branch passages 2a and 2b could occur in various ways. As one example, the fluid supplied to the common conduit 1 may be a stream of air carrying airborne powdered material such as flour. Such material could pack in the conduit at a particular location to obstruct continued flow of fluid through the conduit. If the obstruction is removed, or substantially decreased by the additional flow of fluid into such partially-obstructed conduit, the increase in velocity of flow past the valve will immediately decrease the fluid pressure between the valve element radial side 3b and the wall of the valve body opposite it, so that the pressure on the valve body side 3b will be decreased, resulting in a decrease in the differential pressure acting on the valve sides 3a and 3b. As such pressure differential is reduced, the force of spring 6 on arm 5 will swing the valve element toward the centered full-line position of FIG. 1. When the obstruction has been cleared completely, the spring will restore the valve to its normal centered position shown in full lines.

If the valve mechanism is disposed with the axis of pivot 4 upright, as shown in FIG. 1, reliance to restore the valve 3 to its normal centered position shown in full lines must be placed entirely on the position-restoring means 6. On the other hand, the force of gravity acting on the valve element 3 will supplement the restoring force produced by the spring if the axis of pivot 4 is substantially horizontal, as shown in the embodiment of FIG. 2. In this instance, the common conduit 8 extends upward from the branch conduits 9a and 9b, which are in horizontal alignment. As in FIG. 1, the conduit elements 8, 9a and 9b are combined in the form of a tee. The valve element 3 is the same as that of FIG. 1, and it is mounted in the valve body formed by the junction of the conduits 8, 9a and 9b in the same relationship. The position-restoring means for the valve 3 also is shown as including an arm 5, tension spring 6 and anchor 7, as before.

The action of the valve 3 shown in FIG. 2 in response to a disturbance of the fluid flow pattern through the conduit system is generally the same as that described in connection with FIG. 1. In the case of FIG. 2, however, the force of spring 6 tending to restore the valve 3 to its normal position is augmented by the effect of gravity on the valve body which is depending from the pivot rod 4. The effect of gravity will be generally proportional to the mass of the valve and its distribution. Thus, if the valve 3 of FIG. 2 is of solid construction instead of being of sheet construction, like the valve shown in FIG. 1, the gravitational restoring force will be greater. Moreover, if the material of which the valve element is made is of high specific gravity, the restorative gravitational effect will be greater. Thus, such effect will be greater for a valve element made of cast iron than for one made of cast aluminum, and the restorative effect will be greater for a valve body of solid cast aluminum than for a solid valve body of light molded plastic material.

In some instances, it may be desirable not simply to rely on the increased opening provided by movement of the valve to a partially-clogged line to restore the operation of the system to its original condition. On the contrary, it may be desirable to stop the flow of fluid through the system immediately, or at least to actuate a warning signal, either visual or audible. For this purpose, an extension 10 can be provided on arm 5 extending oppositely at the opposite side of pivot 4. To such arm extension an actuator rod 11 can be connected by a pivot 12. Such actuator rod can be connected to a switch for energizing a warning circuit or a control circuit or the rod itself could be connected to a suitable warning device, the position of which is shifted mechanically, as may be preferred.

The device of FIG. 3 is somewhat similar to that of FIG. 2, except that in this case, a modified type of swing-sector valve is shown, the movement of which is less abrupt. In this instance, the valve 13 has radial sides 13a and 13b, which are shorter than the corresponding valve elements sides 3a and 3b of FIG. 2. The central portion of the arcuate valve element side 13c is of cylindrically arcuate shape, but the opposite extremities of such arcuate side are relieved by being curved more sharply than the central portion. Consequently, when the valve element is swung from its broken line central position of FIG. 3 to an extreme position such as shown in solid lines, a passage communicating with branch conduit 9a is provided between the end portion 13e of the arcuate wall and the opposite wall of the valve body supplemental to the passage between the opposite wall of the valve 13a and the side of the valve body opposite it.

When a valve having a configuration like valve 13 in FIG. 3 is in or near its normal centered position shown in broken lines in FIG. 3, its operation is the same as that of the valve 3 shown in FIG. 2. A valve of the type shown in FIG. 3 has less tendency, however, to move into the extreme position shown in solid lines in that figure because, as the valve approaches that position, fluid will move into branch conduit 9a, both past the radial valve side 13a and past the opposite extreme portion 13e of the arcuate valve side 13c. When the resistance to flow through a conduit increases, therefore, the valve 3 of FIG. 2 will swing farther from its normal centered position than the valve 13 of FIG. 3 if the valves are made of the same material. The valve will tend to remain in such throttling position until the pressure differential acting on the valve reverses, causing the valve to swing back to or through such centered position.

The position of maximum swing of the valve from its normal centered position shown in broken lines in FIG. 3 can also be established by providing a positive stop engageable by the valve before it can swing into contact with the valve body wall. Such a stop can be an adjustable screw 14 shown in FIG. 3, which can be locked in any adjusted position. Such screw would be engaged by the valve element side 13a, or a cushioning pad on it, depending upon the adjusted position of the stop screw. Such a screw could also be provided in conduit 9b to be engaged by valve element wall 13b, if desired. Moreover, such a stop screw or screws could be applied to the valve mechanisms of the types shown in FIGS. 1 and 2, if desired.

In the swing valve installation shown in FIG. 4, the valve 3 is of the same type as described in connection with FIG. 2, and such valve is mounted in the same relationship to the common conduit 8. Also, the valve pivot rod is substantially horizontal, as it is in FIGS. 2 and 3. In this instance, however, the branch conduits 9c and 9d are neither in alignment nor are they horizontal. On the contrary, the conduit bifurcations 9c and 9d are disposed at an acute angle to each other at their junction, and such conduits are then curved so that they may reach parallelism a short distance below the junction. Nevertheless, the function and method of operation of valve 3 is substantially the same as described in connection with FIGS. 1 and 2.

The valve installation illustrated in FIG. 4 does have one modification, however, which is that the spring-type of position-restoring means has been replaced by a mercury switch 15 mounted on the lower end of the arm 5, instead of the spring 6. When the valve 3 has been displaced angularly in either direction a predetermined amount, the body of mercury in the mercury switch tube 15 will have flowed in one direction or the other to complete a connection between the wires of one set 16 to complete an electric circuit. This circuit can actuate an alarm or control mechanism to stop the supply of fluid to the conduit system, or the circuit can effect both of such functions, and may recenter the valve.

In the valve mechanism assembly of FIG. 5, the branch conduits 9e and 9f again are disposed at an acute angle to each other, but the conduit assembly is not symmetrical about a vertical plane. On the contrary, the branch conduit 9f is in vertical alignment with the common conduit 8, but the branch conduit 9e forms an offshoot to the left from the vertical alignment of the common conduit 8 and branch conduit 9f. In this instance, the valve 17 is of the same general construction as the valve elements described above and operates generally in the same way, but instead of the apex angle of the sector being approximately a right angle, it is approximately 35°, corresponding generally to the angle between the branch conduits 9e and 9f.

In FIG. FIGS. 6 and 7, the angle between the branch conduits 9g and 9h inclined downwardly from the common conduit 8 is approximately 90°. In this instance, the conduit assembly is symmetrical about a vertical plane. The swing sector valves in these instances, like that of FIG. 5, have cylindrically-arcuate sides 18c and 19c which cooperate with the ridge forming the junction between the branch conduits, instead of such arcuate valve side cooperating with a flat internal surface of the valve body, as in the case of FIGS. 2 and 3. The valve body 3 of FIG. 4 also cooperates with the ridge between the branch conduits 9c and 9d, instead of with a flat surface.

The valve element 18 of FIG. 6 has generally radial sides 18a and 18b disposed at an acute dihedral angle, which are not precisely flat, as are the radial sides of the sector valves described previously. On the contrary, such substantially radial sides 18a and 18b are somewhat concave, so that when the valve element is in its normal centered position of FIG. 6, the passage alongside each of such substantially radial valve sides will be less restricted than they would be otherwise. Such concave radial valve sides could, if desired, be provided for the valve elements 3 of FIGS. 1, 2 and 4, and for the valve element 13 of FIG. 3.

The arcuate side 18c of the valve element 18 in FIG. 6 may be a circular arc, or have its end portions relieved, and is of a chordal extent at least equal to the width of the branch conduit 9g or 9h, so that when the valve swings about its pivot 4 from the centered broken line position of FIG. 6 into the solid-line position, for example, the arcuate side of the valve will at least substantially span the width of the branch conduit. The valve 17 of FIG. 5 and the valve 18 of FIG. 6 may be provided with suitable position-restoring means such as discussed in connection with FIGS. 1 and 2, or circuit-closing means such as described in connection with FIG. 4, or both, if desired.

The valve 19 disclosed in FIG. 7 differs from the valve 18 of FIG. 6 in having flat radial sides. The particular feature of importance in this valve mechanism is the utilization of a shiftable weight in the position-restoring means provided for the valve element. A ball cage 20 mounted on the swinging end of arm 5, which is attached to the pivot rod 4, extends circumferentially through an arc concentric with the valve pivot. In this cage is a ball 21 which can roll from end to end of the cage, as the arm 5 is swung in one direction or the other from the centered upright position shown in FIG. 7.

The ball 21 of the position-restoring means shown in FIG. 7 is ineffective to produce any force on valve 19, tending to return it to the normal centered position shown in FIG. 7 until the arm 5 has swung far enough so that the ball will roll into contact with an end wall of the cage 20. Further swinging of the valve in one direction or the other about pivot 4 will lift the ball so that the force of gravity on it will tend to swing the valve back toward centered position. The farther such valve swings from its centered position, the more ball 21 will be lifted for a given angular displacement of the valve and arm 5. The heavier the ball 21, the greater will be its effect in applying a restoring force to the valve. Thus, if the ball is made of steel, for example, its effect will be greater than if the ball is made of aluminum.

The conduit assembly as shown in FIGS. 8 and 9 is of tee-shape, upwardly projecting common conduit 8 and the branch conduits 9a and 9b in horizontal alignment as in FIGS. 2 and 3, but the branch conduits could be disposed at a different angle, such as shown in FIGS. 4, 5, or 6, if desired. As illustrated, the valve element 22 is of solid construction, but it has a large lightening hole 23 in its central portion extending axially generally parallel to the axis of pivot 4 and preferably of cylindrical shape. Again, such a valve can be provided with any type of position-restoring means such as described above. Also its convex side can be of circular arcuate shape or its circumferential ends can be relieved.

The valve structure shown in FIGS. 8 and 9 is particularly suitable for unbalancing so that its normal position will not be centered with respect to the common conduit 8, but can be that shown in solid lines in FIG. 8, for example, swung to one side of centered position to some extent. Flow of fluid through common conduit 8 toward the branch conduits 9a and 9b would therefore be split unequally, such as to compensate for one branch conduit being of smaller cross section than the other, for example. Such a valve can be unbalanced by providing a series of axially-extending bores 24 spaced circumferentially adjacent to the convex side of the valve. If the valve element is made of relatively light material, such as molded plastic or extruded, cast or machined aluminum, one or more of the bores 24 can be filled with a heavy metal filler 25, such as of lead or iron. Such filler rod may be preformed as a rod and pressed or bonded into the bore, or could be balls or shot, or molten metal could be poured in place. The particular holes selected to be filled with metal will determine the normal position which will be assumed by the valve 22 when it is not subjected to differential pressure.

Particularly where the valve weight is unbalanced, as discussed above, it may be desirable to provide stops to prevent the valve from swinging into completely closed position. For this purpose, an adjustable stop such as the stop 14 shown in FIG. 3, can be used, or stop pin 14' can be provided as shown in FIGS. 8 and 9, which projects through the side wall of the valve body in a direction parallel to the axis of the valve pivot 4. Such stop pins can be arranged to be screwed inwardly into the path of movement of the valve 22 as it swings toward a position for closing one branch conduit 9a or the other branch conduit 9b, or such stop pins can be retracted out of the path of movement of the valve, as may be preferred.

In FIGS. 10, 11 and 12, the fluid flow in the conduit system is reversed, so that fluid is flowing from the two branch conduits 9a and 9b past the sector-shaped valve element 3 to the common conduit 8. Such a flow of air may be effected by applying suction to the common conduit 8. If the branch conduits 9j 9a and 9b are unobstructed, the tension spring 6 of the position-restoring means in FIG. 10 will maintain the valve element in its centered position shown. On the other hand, if one of the branch passages 9a and 9b should become clogged to a greater or lesser extend extent, the airflow from such branch to the common conduit 8 would decrease, and the pressure in such branch acting on the radial side of the valve 3a or 3b would increase. At the same time, the flow from the other branch conduit to the common conduit 8 would tend to increase, and the static pressure of the air in that branch conduit would decrease. The resulting pressure differential on the valve 3 will tend to swing it in a direction to throttle the flow of air from the unobstructed branch conduit to the common conduit so as to attempt to equalize the flow from the branch conduits to the common conduit.

As the valve 3 swings from its normal centered position shown e FIG. 10 f the action of a pressure differential on it, the radial valve face in the obstructed branch conduit will be swung toward a position perpendicular to the flow of air through c branch conduit so that a dynamic or b, force of the air flowing through such e conduit will f the static pressure differential to effect swinging of the valve element away from its normal centered position. Such swinging would, of course, as described in connection with c 1 and 2, for example, be opposed by the increasing e in spring f of the position-restoring means. When a obstruction in b of the branch conduits 9a and 9b has been removed, the spring will return the valve element to its normal central position.

In the valve mechanism shown in FIGS. 11 and 12, vanes 3e and 3f are shown as being connected to the apexes of the sector valve remote from the main valve pivot 4 and located at the circumferentially-opposite ends of the arcuate valve side 3c by subordinate pivots 4a and 4b, respectively. Such subordinate pivots enable the vanes 3e and 3f to swing freely relative to the valve 3. Such vanes are of a width transversly of their pivots greater than the radius of the convex side 3c of the valve 3. The ends of the vanes 3e and 3f remote from the pivots 4a and 4b have beads or bulbs to enable them to slide readily along the surface of the valve body, as the valve element 3 swings about its pivot 4 between the centered position shown in FIG. 11 and a flow-checking position such as shown in FIG. 12.

In general, the action of the valve arrangement shown in FIGS. 11 and 12 is similar to that of the valve mechanism shown in FIG. 10, but the addition of the vanes 3e and 3f alters the pressure pattern on the valve element to some extent. Thus, while the valve 3 has been swung from the normal centered position shown in FIGS. 10 and 11 to a throttling position in FIG. 12, the static pressure and the dynamic pressure acting on the left side of the valve assembly, including the radial surface 3a, will be substantially the same as would be the situation for valve 3 in the assembly of FIG. 10. In swinging to the position of FIG. 12 because of a reduction in the velocity of flow through conduit 9a, the flow of fluid through branch conduit 9b would not be reduced appreciably until the valve had swung through a considerable angle.

As shown in FIG. 12, the farther valve 3 is swung from its centered position, the farther vane 3f will be swung toward a position transverse to the flow of air through branch conduit 9b. It will be seen that as the valve approaches the position of FIG. 12 the flow of air through the branch conduit 9b which strikes the inclined vane 3f will have a substantial force component perpendicular to such vane. Such force component will produce a moment acting about the point of contact of the end of vane 3f with the floor of branch conduit 9b, which will oppose swinging of the valve away from its centered position and tend to restore it to such centered position. The force thus exerted on the vane 3f will supplement the force produced by any position-restoring means which may be attached to the valve, such as the tension spring 6 and arm 5 shown in FIG. 10. The development of such a force component on a vane will deter d swinging of the valve toward a branch conduit throttling position.

FIGS. 13 and 14 show a modification of the valve installation of FIGS. 11 and 12, in which the sector valve 13 is of the type shown in FIG. 3, rather than being of the type of FIG. 2. The convex side 13c of this valve has circumferential end portions 13e of sharper curvature than the central portion of such convex side. To the apexes of this valve at opposite ends of the convex side are attached vanes 13f and 13g, respectively, which are similar to the vanes 3e and 3f illustrated in FIGS. 11 and 12. In this instance, however, the vanes have apertures 13h through them, affording access for flow from one branch conduit to the other past the valve.

When the valve 13 is in its normal centered position, as shown in FIG. 13, the central portion of the convex surface 13c will be disposed closely adjacent to the wall of the valve body so as to preclude any appreciable flow between the branches 9a and 9b through the apertures 13h of the vanes 13f and 13g. When the valve is subjected to a pressure differential at its opposite sides because of decreased flow through through the branch conduit 9a, for example, the valve will swing toward the position shown in FIG. 14. When the valve is in this position, fluid can flow from the branch conduit 9b through the aperture 13h in vane 13g between the convex valve surface 13e and the adjacent wall of the valve body, and through the aperture 13h of vane 13f into branch conduit 9a to join the flow through that conduit past the left side of valve 13 into common conduit 8.

The effect of the bypassing flow through the two apertures 13h and past the convex side 13e of valve 13 will be to increase the velocity of flow past the left side of the valve and to decrease the velocity of flow past the right side of the valve, as compared to the velocities of flow which would occur in the valve installation of the type shown in FIGS. 11 and 12. Consequently, the pressure differential acting on valve 13 will be less, and the valve will not swing as far as it would in the case of FIGS. 11 and 12. Also, it will be evident that the vanes 13f and 13g produce a more streamlined flow through the branch conduits to the common conduit 8 than would otherwise be the case.

In both the installations shown in FIGS. 11 and 12, and in FIGS. 13 and 14, position-restoring means as previously described of either the spring-type or the gravity-type can be provided. In addition, or instead of such previously-described position-restoring means, the pivots 4a and 4b can be of the spring-hinge-type, so that as the vane swings toward a more acute angle to a radial surface 3a or 3b, the force of the spring will be increased, whereas the force of the other spring will be decreased. By such spring action, the vanes themselves will serve as position-restoring means.

In FIGS. 15 and 16, a different type of pressure-actuated valve arrangement is shown. In this instance, the adjacent conduits 26a and 26b may or may not be connected together, but the flows of fluid through them are related in some manner so that, when the flow through one of such conduits is reduced, the flow through the other conduit will be throttled and may be checked completely. In apparatus of this type, it is immaterial whether the fluid is flowing in the same direction in the two conduits 26a and 26b, and actually, the fluid flow may be in one direction in one conduit and in the opposite direction in the other conduit. The important consideration is that the conduits be connected together so that any pressure differential caused by flow of fluid through them will be imposed on the valve mechanism.

Stub conduits 27a and 27b connected to the sides of the a conduits 26a and 26b, through which fluid flows, are connected by a tube 28 in which an elongated lengthwise reciprocable valve is received. Such valve includes two end sections 28a and 28b, which are connected by a central tube 28c. The ends of such elongated valve element are of substantially hemispherical shape. The valve end elements 28a and 28b can be connected for conjoint movement by the central tube 28c having connecting bolts 28d for securing the valve end elements to the closed ends of the central tube 28c, respectively.

The valve end elements 28a and 28b are sealed relative to the housing tube 28 by rolling return-folded annular collars 28e and 28f. The outer end of each of these collars is secured in the joint between an end section 27a or 27b of the conduit connecting the two fluid-flow conduits 26a and 26b and the central section 28 of such conduit. The inner end of each such rolling collar seal is secured to the respective valve end section 28a or 28b. As the valve element reciprocates within the casing 28, therefore, the positions of the folds in the rolling collars will be altered from the extreme position at the left of FIG. 16 to the extreme position at the right of that FIG.

If the flow of fluid through one of the conduits 26a and 26b is restricted to a substantial degree, the static pressure in that conduit acting on the adjacent end of the valve body will increase so as to produce a differential end pressure acting on the opposite ends of the valve element. Consequently, the valve element will move from the high pressure conduit toward the other conduit. Any movement of an end of such valve element into one of the conduits 26a and 26b will restrict the passage through it so that it will be necessary for the flow velocity past the end of the valve to increase. Such increase in flow will produce a decrease in pressure because of the reduced speed of the flow past the valve end. Such reduction in pressure will increase further the overall differential end pressure on the valve element so that a progressively greater force differential will act on the valve element, tending to move it in a direction to throttle the flow of fluid through the unobstructed conduit.

When the valve element has been reciprocated into a position such as shown in FIG. 16, in which the valve end portion 28a 35 has plugged the passage through the conduit 26a, it would be difficult simply by attempting to regulate the velocity of flow through the two conduits 26a and 26b to produce a differential pressure on the valve element which would restore it to its centered position of FIG. 15. Consequently, it is desirable to provide position-restoring means to move the valve element back to its centered position of FIG. 15 when the pressures in conduits 26a and 26b resulting from flow of fluid through them have been equalized.

The position-restoring means shown in FIGS. 15 and 16 are of the compression spring type, and include a central tube 29 through which the tube 28c connecting the valve end components 28a and 28b can slide. Compression springs 30a and 30b are arranged to encircle the telescoping tubes 28c and 29 at opposite sides of a central fixed partition 31 in tube 28. The tube 29 extends through an aperture in the center of partition 31, and may be secured to such partition, such as by welding. The adjacent ends of springs 30a and 30b then bear against opposite sides of this partition and the opposite ends of such springs bear against the end components 28a and 28b, of the valve, respectively.

As the valve 28a, 28b, 28c is shifted lengthwise from the central position of FIG. 15 toward a conduit-throttling position such as shown in FIG. 16, one of the springs, in this case, spring 30b, will be compressed farther while the other spring 30a will be given room to expand. When the fluid pressure on the opposite end components 28a and 28b of the valve is equalized, or the differential end pressure reduced, the spring 30b will exert a force tending to return the valve from the position of FIG. 16 to the right toward the centered position of FIG. 15. If the fluid pressures acting on opposite ends of the valve are balanced, the springs 30a and 30b will again center the valve in the position shown in FIG. 15.

In the reciprocable valve assembly shown in FIG. 17, the valve element is essentially the same as that shown in FIGS. 15 and 16. In this instance, however, instead of the valve end components 28a and 28b being connected by a small tube, they are mounted on opposite ends of a comparatively large tube 28g. The sealing collars 28e and 28f are assembled around this large tube 28g in the same manner as shown in FIG. 15. In this instance, however, the position-restoring means is located at the side of conduit 26b remote from conduit 26a, instead of the position-restoring means being housed within the valve and valve body. A rod 32 connected to the valve end component 28b extends transversely through one conduit 26b and projects through a hole 33 in the side of such conduit remote from the valve and valve body.

A tube 34 concentric with the rod 32 projects from the side of conduit 26b remote from the valve and valve body. The end of such tube remote from conduit 26b is closed by a cap 35 having in its central portion an aperture through which the rod 32 can project. A partition 38 is received in the central portion of tube 34, and compression springs 39a and 39b are inserted within the tube 34 between its ends and the partition 38. Such partition is secured to the rod 32 in a position such that it will be centered between the opposite ends of tube 34 when the valve 28a, 28b, 28g, is centered in the valve body 28. As the valve element is reciprocated in one direction or the other lengthwise of the valve body by unequal pressures in the conduits 26a and 26b, the springs 39a and 39b will be altered in length correspondingly. Thus, if the valve is shifted to the left in FIG. 17, spring 39a will be contracted so as to produce a force tending to restore the valve element to its central position. The operation of this valve assembly will therefore be the same as that described in connection with the valve shown in FIGS. 15 and 16.

In FIG. 18, the swinging valve 40 corresponds generally to the valve 3 of FIGS. 11 and 12, but in this instance, the valve is simply a plate which may be of substantially uniform thickness throughout its area. This plate is swingably supported by pivot 4 connected to one edge extending transversely of common conduit 1 and disposed midway between its sides. Vane 40c is pivoted by subordinate pivot 4a to one side 40a of the valve, and the other vane 40d is pivoted by subordinate pivot 4b to the other side 40b of the valve plate. When the valve plate swings in one direction or the other from the normal central position shown in full lines in FIG. 18, the swinging edges of vanes 40c and 40d will remain in contact with the bottom wall of the valve body to maintain a seal between the passages at opposite sides of the valve plate in communication with the branch conduits 2a and 2b, respectively.

If desired, the subordinate pivots 4a and 4b may be spring-pressed, so that the hinge of the under pivot will be stressed as the valve plate swings upward from the under vane. Such spring-pressed hinge will constitute position-restoring means. Alternatively, an arm and tension spring can be attached to the pivot rod 4, as described in connection with FIGS. 1 and 2, for example. In some instances, the pendulous weight of the plate 40 alone may constitute a sufficient position-restoring means, but if desired, it could be supplemented either by the spring-type of position-restoring means, or by a weight-type such as shown in FIG. 7, for example.

While two vanes 40c and 40d are shown as being attached to the swinging edge of valve plate 40, a single vane only could be used if it were weighted, or if the hinge attaching it to the plate were arranged to urge the free edge of the vane into contact with the wall of the valve body.

In FIG. 19 adjacent conduits 41a and 41b are shown in side-by-side relationship and may have a common wall 42. A pivot rod 43 extends transversely of such conduits and preferably the common partition wall 42 is interrupted to accommodate a sector-shaped valve 44 swingably supported by such pivot rod. The pivot rod can be located in the plane of the partition wall and supports the apex of the valve.

The conduits 41a and 41b are shown as being of substantially square cross section, but each conduit could be of rectangular cross section provided that the width of each conduit parallel to the wall 42 is approximately equal to the axial width of the valve 44 so that the valve ends 44d are located closely adjacent to the walls of the conduits to which the common wall is joined. The widths of the conduits perpendicular to the partition wall 42 preferably are equal and preferably are less than, or at least not appreciably greater than, the radial distance between the center of the pivot rod and the cylindrically arcuate portion of th the valve side 44c.

When the valve 44 is in its centered position the radial walls 44a and 44b are disposed at equal angles to the common wall 42. The flow of fluid through the conduits 41a and 41b may be in the same direction, or such flows may be in opposite directions as indicated by the arrows in FIG. 19. In that instance, the fluid flow through conduit 41a is shown as being downward, whereas the fluid is flowing upward in the right conduit 41b. In whichever direction the fluid is flowing, if the passages at opposite sides of the valve 44 through the two conduits are of equal cross section and the velocity of flow of fluid through the two conduits is the same, the valve would tend to maintain its centered position, particularly if the apexes at opposite ends of its arcuate side 44c are rounded to reduce the turbulence of flow through the venturi passages formed by the valve in the two conduits.

If, for some reason, such as because of increased resistance or decreased resistance to the flow of fluid through one of the conduits, the velocity of such flow changes, the pressure exerted on that side of the valve will change correspondingly, the pressure being increased as the velocity decreases and the pressure being decreased as the velocity increases. The resulting differential pressure produced on the opposite sides of the valve will cause it to swing about the axis of pivot rod 43 toward the low pressure side, such as into the broken line position shown in FIG. 19. Such swinging will restrict the cross-sectional area of the passage through the conduit into which the valve swings and will increase the cross-sectional area of the passage through the other conduit, so as to tend to equalize the quantities of fluid l flowing through the two conduits.

A force may be applied to the valve tending to deter its swinging, such as by attaching to the pivot rod 43 spring-actuated position-restoring means fastened to an arm 5, as described in connection with FIGS. 1 and 2. Such force-exerting means can be arranged to establish a normal position of the valve which is not centered such, for example, as described in connection with FIGS. 8 and 9. In either case the force produced by such means to deter swinging will increase progressively as the valve swings farther from its normal position.

Also, the convex surface 4c of the valve can be of the type shown in FIG. 3 in which the opposite end portions of the convex surface are relieved by being formed of sharper curvature than the central portion of such surface.

I claim:

1. Flow-actuated valve mechanism comprising two branch conduits, a common conduit communicating with said two branch conduits for flow of fluid through said two branch conduits in the same direction with the velocity of flow lower and the fluid pressure higher in one branch conduit than in the other branch conduit, and pressure-responsive valve means including a swingable valve member and pivot means supporting said valve member and located adjacent to one edge thereof so that substantially the entire area of said valve member extends from said pivot means away from said common conduit for swinging to close substantially completely one or the other of said branch conduits without altering appreciably the size of passage through said common conduit, the opposite sides of said valve member being exposed to the fluid pressures in said two branch conduits, respectively, and said pivot means mounting said valve member for free swinging by the differential between the higher fluid pressure in the one of said branch conduits having the slower fluid flow therethrough and the lower pressure in the other of said branch conduits having the faster fluid flow therethrough to close substantially completely the one of said two branch conduits having the faster flow therethrough.

2. The valve mechanism defined in claim 1, in which the valve member is a swingable sector valve, and the pivot means mounts said sector valve substantially at its apex.

3. The valve mechanism defined in claim 2, in which the sector valve has side faces disposed substantially radially of the axis of the pivot means, which side faces are concave.

4. The valve mechanism defined in claim 2, in which the sector valve includes a convex side opposite its apex, the circumferential end portions of which convex side have a sharper convex curvature than the central portion of such side.

5. The valve mechanism defined in claim 2, and vanes respectively connected to the apexes of the sector valve at circumferentially opposite ends of its arcuate side.

6. The valve mechanism defined in claim 1, and signal means connected to the valve means for operation thereby when the valve means has been displaced a predetermined distance from a central position.

7. The valve mechanism defined in claim 1, and control means connected to the valve means and operable automatically in response to predetermined departure thereof from normal position.

8. The valve mechanism defined in claim 1, and a vane flexibly connected to a portion of the valve member spaced from the pivot means, said vane being of a length exceeding the radial extent of the valve member and extending to a conduit wall.

9. The valve mechanism defined in claim 1, in which fluid flows from the two branch conduits to the common conduit and vanes respectively flexibly connected to a portion of the valve member spaced from the pivot means axis each of said vanes being of a length exceeding the radial extent of the valve member and extending to a conduit wall.

10. The valve mechanism defined in claim 2, in which fluid flows from the two branch conduits to the common conduit, and vanes respectively flexibly connected to the apexes of the sector valve at circumferentially opposite ends of its arcuate side, each of said vanes being of a length exceeding the radius of the sector valve and extending to a conduit wall.

11. The valve mechanism defined in claim 4, in which fluid flows from the two branch conduits to the common conduit, and vanes respectively flexibly connected to the apexes of the sector valve at circumferentially opposite ends of its arcuate side, each of said vanes being of a length exceeding the radius of the sector valve and extending to a conduit wall, and each of said vanes having an aperture therethrough.

12. The valve mechanism defined in claim 1, and lost-motion weight means effective to produce a restoring force on the valve member urging the valve member to swing toward a central position only after it has swung a predetermined distance from such central position.

13. The flow-actuated valve mechanism defined in claim 1, in which the branch conduits and the common conduit are all of approximately the same cross-sectional area.

14. Flow-actuated valve mechanism comprising two branch conduits and a common conduit connected at a junction, and valve means received in said junction defining bent venturi passages at opposite sides thereof between said common conduit and said two branch conduits, respectively, and movable by a differential in pressure acting thereon to increase the cross-sectional size of one of such venturi passages and simultaneously to decrease the size of the other of such venturi passages.

15. The valve mechanism defined in claim 14, in which the valve means includes a swingable sector valve, and pivot means mounting the apex of said sector valve at the common conduit side of the junction.

16. The valve mechanism defined in claim 15, in which the sector valve includes a convex side opposite its apex, the circumferential end portions of which convex side are relieved so that their radial distance from the pivot means is less than the radial distance from such pivot means of the central portion of such convex side.